United States Patent [19]

Weiss

[11] Patent Number: 4,572,026
[45] Date of Patent: Feb. 25, 1986

[54] GEARBOX FOR A VEHICLE

[75] Inventor: Heinz Weiss, Bensheim, Fed. Rep. of Germany

[73] Assignee: Deere & Company, Moline, Ill.

[21] Appl. No.: 529,470

[22] Filed: Sep. 6, 1983

[30] Foreign Application Priority Data

Jan. 5, 1983 [EP] European Pat. Off. ........ 83300039.1

[51] Int. Cl.[4] ........................ F16H 37/08; F16H 57/02
[52] U.S. Cl. .................................. 74/700; 74/606 R;
74/15.66; 74/360
[58] Field of Search ...................... 74/11, 15.66, 15.69,
74/606 R, 665 G, 331, 356, 700, 360

[56] References Cited

U.S. PATENT DOCUMENTS

| 954,531 | 4/1910 | Mack | 74/700 X |
|---|---|---|---|
| 957,263 | 5/1910 | Shlig | 74/700 X |
| 983,864 | 2/1911 | Smith | 74/700 |
| 1,033,176 | 7/1912 | Huff | 74/700 |
| 1,386,614 | 8/1921 | Frins | 74/700 |
| 3,122,025 | 2/1964 | Mark et al. | 74/11 |
| 4,108,021 | 8/1978 | MacAffee et al. | 74/606 R |
| 4,116,090 | 9/1978 | Zenker | 74/665 G |
| 4,208,923 | 6/1980 | Ikegami | 74/665 G |
| 4,244,232 | 1/1981 | Murayama | 74/606 R |

FOREIGN PATENT DOCUMENTS

| 1930681 | 1/1971 | Fed. Rep. of Germany. | |
|---|---|---|---|
| 2403710 | 7/1975 | Fed. Rep. of Germany. | |
| 2941062 | 5/1980 | Fed. Rep. of Germany. | |
| 1330220 | 5/1963 | France | 74/606 R |
| 2305651 | 10/1976 | France | 74/11 |
| 67048 | 12/1913 | Switzerland | 74/700 |
| 2036205 | 6/1980 | United Kingdom. | |

Primary Examiner—Carlton R. Croyle
Assistant Examiner—Paul F. Neils

[57] ABSTRACT

A gearbox has an input shaft on a longitudinal shaft line which is also the line of a change-speed gear main shaft. A countershaft is on a parallel shaft line. Half axles are on a third, co-planer shaft line, the plane being the parting plane between bottom and top casing parts, whereby assembly and servicing are simplified. Enclosed within the casing is a PTO shaft, the change-speed gear, a first range of splitter gear, a second range gear doubling the available forward speeds, a mechanical front wheel drive and a preliminary gear establishing the correct input torque.

10 Claims, 2 Drawing Figures

GEARBOX FOR A VEHICLE

BACKGROUND OF THE INVENTION

The present invention relates to a gearbox for a vehicle, such as an agricultural vehicle. The gearbox is of the type known as a trans-axle which incorporates a differential and half-shafts of an axle, as well as a change speed gear.

Many agricultural tractors are constructed without a complete chassis or frame and the gearbox is not merely part of the transmission; it is also a structural item performing part of the function of a chassis. In such constructions, the gearbox is a strongly built, expensive item and a range of vehicles of different sizes and powers requires a corresponding range of gearboxes. Manufacturing costs are therefore high.

A gearbox described in our U.S. patent application, Ser. No. 419,091, filed Sept. 16, 1982, is a transverse gearbox in which the rotating components are mounted essentially on two parallel shaft lines, one of which is also the line of the two rear axle half-shafts. The components of the gearbox are contained within a housing formed of upper and lower parts with a parting plane which contains the aforesaid two shaft lines. The components can thus readily be assembled into the bottom casing part, the top being thereafter fitted. Servicing, as well as manufacture, is simplified. The casing is preferably of relatively light shell form, the gearbox being a non-structural part mounted in the framed vehicle.

The transverse gearbox is very compact in the longitudinal direction of the vehicle which has advantages in relation to the layout of the vehicle as a whole. However, the gearbox is necessarily of substantial transverse width, especially having regard to the incorporation not only of the change speed gear, but of a range gear, possibly the creep gear, differential, PTO drive and even a mechanical front wheel drive. It would appear to be impossible to fit such a transverse gearbox into narrower agricultural vehicles, such a vineyard or orchard vehicle having an overall width of 1 m or 1.5 m. Although the prior proposal includes mechanical front wheel drive, there is no longitudinal differential. This term is used to denote a differential which divides the power longitudinally, i.e. between the front and rear axles. The differential dividing power between the two half-shafts may correspondingly be referred to as a transverse differential.

The prior proposal furthermore employs a six-speed, change-speed gearbox and a three-speed range gear giving eighteen normal gears. Such a range of gears will typically give road speeds from 1.5 km/h up to 30 km/h, assuming that the gears are sufficiently closely spaced. 30 km/h is a very low speed for traveling on the road and it is desirable to achieve a top speed more like 40 km/h. This requires even more gears and it is difficult to achieve this in a transverse gearbox, as described in the aforesaid prior application.

SUMMARY OF THE INVENTION

The present invention provides a gearbox for a vehicle comprising a change-speed gear having a main shaft and a countershaft on first and second longitudinal shaft lines, respectively, an axle having half-shafts on a third transverse shaft line, a transverse differential driving the half-shafts and driven by a component on one of the longitudinal shaft lines, and a casing enclosing the change-speed gear and the differential and having bottom and top parts with a parting plane which contains the first, second and third shaft lines.

It will be understood that the terms "longitudinal" and "transverse" relate to the direction of travel of the vehicle and the direction transverse thereto.

The nature of the casing allows the internal components of the gearbox to be assembled into the bottom casing part, the top part thereafter being fitted. Servicing the gearbox is also easy, by removal of the top casing part.

To avoid interference with the half-shafts, the PTO shaft is preferably not in the parting plane. Instead, the PTO shaft is set above or below the parting plane and is journalled through one casing part. An input shaft advantageously extends through the hollow main shaft to the reduction gear coupling the input shaft to the PTO shaft. The casing can be recessed around the end of the PTO shaft to achieve a longitudinally compact arrangement and maximize the length of the Cardan shaft. On the other hand, the gearbox casing is preferably cast mainly without recesses or re-entrant parts in order to simplify casting. Lightweight cast shells, preferably of aluminum, can be employed when the gearbox is not a structural item, but is supported by the vehicle frame.

In order to double the number of available forward gears, the change-speed gear preferably provides drive to an intermediate shaft on the first shaft line and thence, to an output shaft on the second shaft line by way of forward and reverse gears. A coupling engageable directly between the countershaft and the output shaft provides the further range of forward gears. The countershaft and output shaft can be hollow to enable a forward drive shaft to pass therethrough for a mechanical front wheel drive. A front wheel brake can act on the forward drive shaft and preferably has the same construction as rear wheel brakes on the half-shafts. A longitudinal differential is employed to divide power flow between the front and rear axles and this differential may be an epicyclic gear with a hydraulic lock. The ratio of the epicyclic gear between the front and rear drives can be selected to correspond to the diameters of the front and rear wheels and the final drive reduction ratios on the two axles.

The main range of speeds available in both forward and reverse can be provided by the change-speed gear (e.g. 4 speeds) in conjunction with a range or splitter gear which can have an optionally selected number of epicyclic stages in accordance with the range of speeds required for a particular application. The stages of the this epicyclic gear, and also a preliminary epicyclic gear, can use the same wheels in order to rationalize production. The preliminary gear can be utilized to establish the correct input torque, while the power through the gearbox is adapted to the vehicle size by the speed at which the gearbox is driven.

The change speed gear is preferably a top-shaft, synchronized gear of a construction known in itself, e.g. from our published British patent specification GB No. 2046853.

The present invention is concerned above all with a gearbox which is suitable for incorporation in a vehicle with a frame and which is of such a construction that manufacture and servicing are relatively easy and inexpensive. Moreover, the construction is such that a modular approach to manufacture may be adopted, whereby a range of gearboxes can be provided with the incorporation or omission of various optional facilities. This makes it possible to provide a wide range of vehicles of varying degrees of sophistication, as well as different sizes and powers, without the expense of manufacturing individually designed gearboxes.

DETAILED DESCRIPTION

Figure 1:
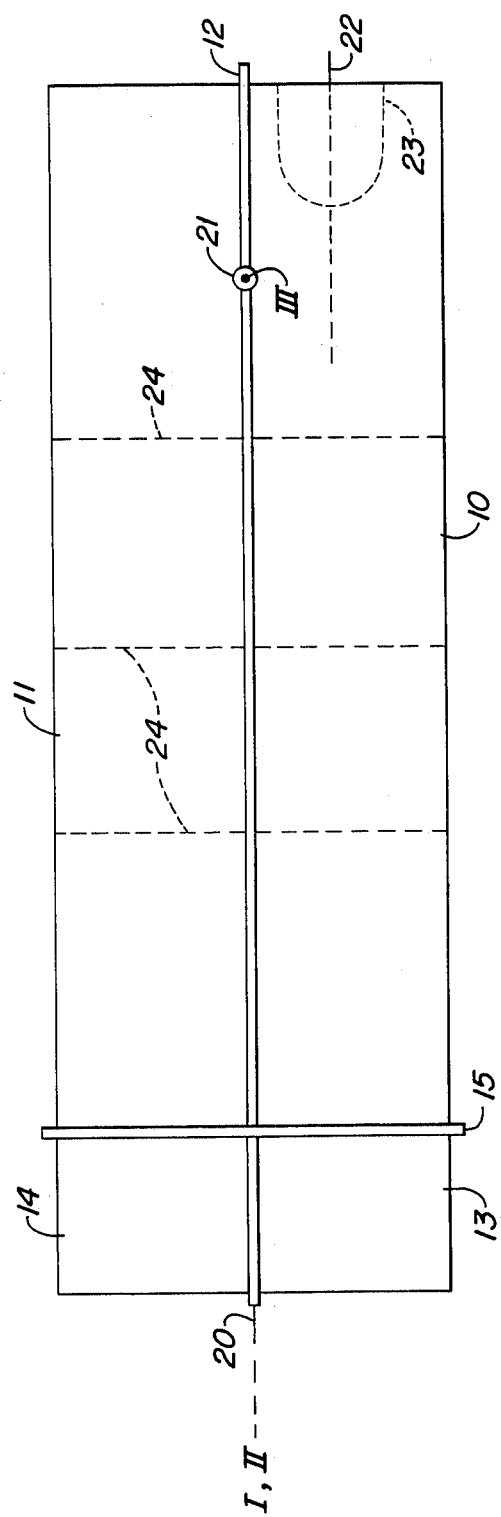
FIG. 1 is a left-hand side view of a gearbox embodying the invention.

Referring to FIG. 1, in which the front of the vehicle is to the left, the gearbox has a main casing with a bottom 10 and a top part 11. These two parts are held together in any suitable manner, as symbolized by flanges 12. At the front of the gearbox, there is an optional front casing with bottom and top parts 13, 14 attached to the main casing, as indicated by flanges 15.

The gearbox is driven from the engine by an engine shaft 20 which lies on a first shaft line I which is also the line of the main shaft of the gearbox. The second shaft line II, i.e., the line of the countershaft, is parallel to and at the same horizontal level as the first shaft line I. A third, transverse shaft line III defines the rear axle denoted in FIG. 1 by the left-hand, half-shaft 21.

All three of the shaft lines I, II, III lie in the parting plane between the bottom part 10 and the top part 11 of the gearbox casing. Moreover, the casing parts are provided with various internal partitions 24 which also separate at the same parting plane. Therefore, the internal components (which will be described with reference to FIG. 2) can conveniently be fitted into the bottom casing part 10, the top casing part 11 finally being fitted. The necessary bearings, both in the partitions 24 and where shafts extend out of the casing, are readily received in appropriately-shaped portions of the casing walls and partitions.

FIG. 1 also shows a PTO shaft 22 which does not lie in the parting plane in order to avoid interference with the axle. The PTO shaft is set below the parting plane in the bottom casing part 10, but it could equally well be set above the parting plane in the casing part 11. FIG. 1 also shows an optional feature according to which the casing part 10 is recessed at 23 so that the stub end of the PTO shaft is largely shrouded within the gearbox casing and a longitudinally compact arrangement is achieved. This increases the length available for the Cardan shaft between the PTO shaft and an implement. In general, however, it is preferred to avoid recessed portions so that the casing parts can be cast easily without the need for corresponding casting cores.

Since the gearbox is to be mounted in the framed vehicle and is not part of the chassis structure, the casing can be relatively lightweight and be cast as a shell. Even if the material is cast iron, the weight of the casing will be small compared with that of a gearbox which is a structural component of a tractor. It is preferred, nevertheless, to use cast aluminum for the casing parts because of the various advantages of this metal. These include reduction in weight, the ability to cast more thinly than is possible with iron, the absence of corrosion and need for painting and good heat dissipation which may even avoid the need for a transmission oil cooler.

Figure 2:
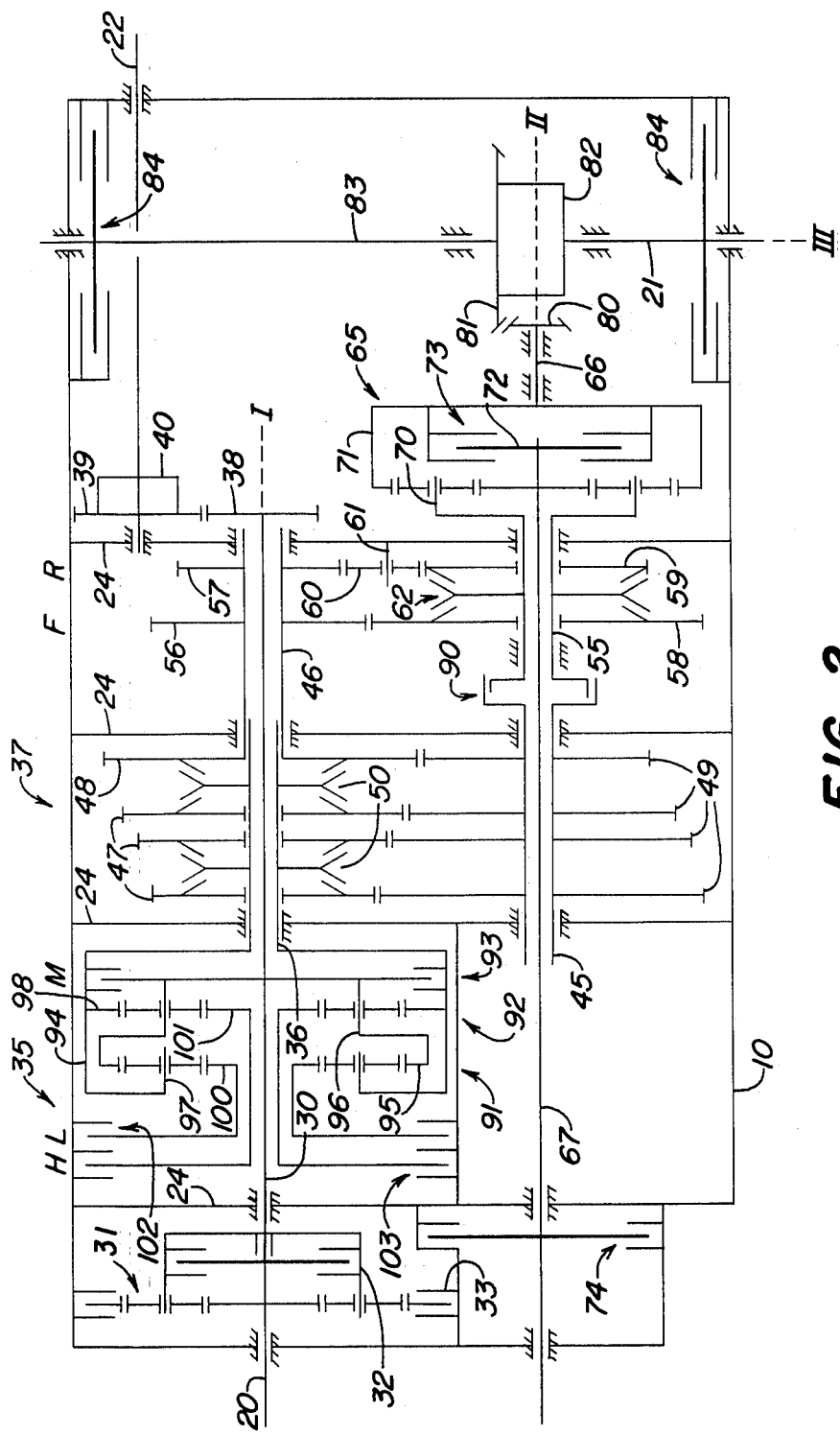
FIG. 2 is a plan view of the gearbox showing the internal components.

FIG. 2 is a plan view of the gearbox with the top casing parts 11 and 14 removed. Also FIG. 2 shows the PTO shaft 22 without the recess 23 of FIG. 1. The shaft lines I, II and III are readily apparent in FIG. 2, as are the partitions 24.

Dealing firstly with the components on the first or main shaft line I, the engine shaft 20 drives an input shaft 30 by way of a speed reducer or amplifier gear 31. This is an epicyclic gear with a brake 33 on its annulus. When the brake 33 is operated, the input shaft 30 is driven with reduction in speed and the gear 31 may thus be used as a creep gear. If desired, an alternative configuration could provide speed amplification for reasons explained below. Direct drive on the engine shaft 20 to the input shaft 30 is achieved by engaging a clutch 32 instead of the brake 33. In any event, the preliminary gear 31 is one of the optional features of the gearbox and, if this gear is omitted, the front housing part 13, 14 can also be omitted, the shaft 20 being coupled directly to the shaft 30.

Continuing along the main shaft line I, there is a first range gear, referred to as a splitter gear 35, which provides high, medium and low speed ranges for the main shaft 36 of a four-speed, change-speed gear 37. The main shaft 36 is hollow and the input shaft 30 continues through the main shaft to a gear 38 in mesh with another gear 39 which is on the PTO shaft line and can be engaged to the PTO shaft by a PTO clutch 40. The gears 38 and 40 form a reduction gear.

The splitter gear 35 will be described in more detail below. For the present, the description of the overall layout of the gearbox continues with consideration of the change-speed gear 37 which comprises the main shaft 36 on the shaft line I, a hollow countershaft 45 on the second shaft line II and a hollow intermediate shaft 46 on the first shaft line I, the input shaft 30 extending through the intermediate shaft 46, as well as the input shaft 36. The intermediate shaft 46 is the output shaft of the change-speed gear 37 which is a four-speed, top-shaft synchronized gear of known form, well proven as a compact and advantageous gear for heavy-duty gearboxes. Three input gears 47 are loose on the main shaft 36 and a fourth gear 48 is fast with the intermediate shaft 46. These four gears 47, 48 are in constant mesh with four gears 49 which are intergral with the countershaft 45. Two synchronized coupling sleeves 50 enable any one of the four gears 47, 48 to be rendered rotationally fast with the main shaft 36. The fourth speed is a direct drive to the intermediate shaft 46 since the gear 48 is fast with the intermediate shaft 46. In the three lower gears, drive is from the selected gear 47 to the corresponding countershaft gear 49 and thence, from the fourth countershaft gear to the gear 48 and the intermediate shaft 46.

Drive is transmitted from the intermediate shaft 46 to a hollow output shaft 55 on the second shaft line II. To this end, forward and reverse drive gears 56 and 57 (forward and reverse being denoted by the letters F and R on FIG. 2) are fast with the intermediate shaft 46. The forward drive gear 56 meshes with a forward driven gear 58 loose on the output shaft 55. The reverse drive gear 57 is coupled to a reverse driven gear 59 by way of an intermediate gear 60 journalled on a stub shaft 61 fixed in one of the partitions 24. The reverse driven gear 59 is also loose on the output shaft 55 and a synchronized coupling sleeve 62 enables either the forward driven gear 58 or the reverse driven gear 59 to be rendered rotationally fast with the output shaft 55.

The embodiment of FIG. 2 provides the optional feature of mechanical front wheel drive and, to this end, a longitudinal differential 65 divides the power flow from the output shaft 55 between a rearwardly extending final drive shaft 66 for the rear axle and a forwardly extending front wheel shaft 67 leading to bevel gears (not shown) for driving the front axle. The forward drive shaft 67 extends through the hollow output shaft 55 and the hollow countershaft 45. The longitudinal differential 65 is an epicyclic gear driven on its planet wheel carrier 70 which is fast with the output shaft 55. The annulus 71 is fast with the final drive shaft 66 while the sun wheel 72 is fast with the forward drive shaft 67. A clutch 73 acting between the sun wheel 72 and the annulus 71 constitutes a differential lock. A front wheel brake 74 is provided on the forward drive shaft 67 within the front casing 13, 14. When the front wheel drive is disengaged, the brake 74 can be engaged to fix the sun wheel 72 and direct all power to the final drive shaft 66.

The final drive shaft 66 carries a bevel gear 80 which is in mesh with the driven bevel gear 81 of the transverse differential 82 whose output shafts are the left-hand half-shaft 21 and the corresponding right-hand half-shaft 83. Brakes 84 for the rear wheels act on the two half-shafts 21 and 83, respectively. The transverse differential 82 is preferably also provided in known way with a differential lock, preferably hydraulically operated.

As thus far described, and ignoring the preliminary gear 31, the gearbox provides a total of twelve gears available in both forward and reverse, by virtue of the three-speed splitter gear 35 and the four-speed, change-speed 37. A further twelve forward gears are made available by a range gear 90 which is a coupling providing direct drive from the countershaft 45 to the output shaft 55. The coupling sleeve 62 must be disengaged when the coupling 90 is engaged. When the coupling 90 is engaged, power flows from the selected one of the four gears 47, 48 to the corresponding countershaft gear 49 and thence, to the countershaft 45 and output shaft 55. There are, therefore, no less than twenty-four gears available in forward. By appropriate selection of the ratios of the three splitter gears, the four change-speed gears and the ratios obtained when forward drive is via the intermediate shaft 46 and when it is via the range gear 90, it is possible to achieve forward speeds from 1.5 km/h to 40 km/h with all gears spaced closely enough to allow for any driving condition.

The form of the various gears incorporated in the gearbox may be varied without departing from the scope of the invention, but the illustrated form of the splitter gear 35 will now be described. The splitter gear 35 comprises first and second epicyclic gears 91 and 92 and a direct drive clutch 93 which clutches the input shaft 30 to a drum 94 which is rotationally fast with the main shaft 36. The input shaft 30 is moreover rotationally fast with the annulus 95 of the first epicyclic gear 91 and the planet carrier 96 of the second epicyclic gear 92. The drum 94 is rotationally fast with the planet carrier 97 of the first epicyclic gear 91 and the annulus 98 of the second epicyclic gear 92. The sun wheels 100 and 101 of the first and second epicyclic gears 91 and 92, respectively, are connected to respective brakes 102 and 103 for selecting low and high ranges L and H, respectively. The middle range M is selected by the direct drive clutch 93.

When the high range brake 103 is engaged, the input shaft 30 drives the planet carrier 96 of the second epicyclic gear 92 and the annulus 98, drum 94 and main shaft 36 are accordingly driven with speed amplification.

When the low range brake 102 is engaged, the input shaft 30 drives the annulus 95 of the first epicyclic gear 91 and the planet carrier 97, drum 94 and main shaft 36 are accordingly driven with speed reduction.

The gearbox illustrated in FIG. 2 is a full facility gearbox which provides 3×2×4 forward gears and 3×4 reverse gears, plus speed reduction or amplification by virtue of the preliminary gear 31. The construction of the gearbox is such that various features can be omitted to provide cheaper ranges of gearboxes for applications not requiring the full range of facilities. As already noted, the preliminary gear 31 can be omitted, the engine shaft 20 being coupled directly to the input shaft 30. Additionally or alternatively, the mechanical front wheel drive can be omitted. This involves omission of the forward drive shaft 67 with its brake 74, as well as the longitudinal differential 65. The hollow output shaft 55 is then connected directly to the final drive shaft 66. Another area of simplification lies in the splitter gear 35. It is possible to omit this gear completely and utilize a direct connection from the input shaft 30 to the main shaft 36, although it is preferred to retain the clutch 93 between these shafts. There are then only 2×4=8 forward speeds and four reverse speeds which will be acceptable for certain vehicles not required to work under adverse conditions. Alternatively, the splitter gear 35 may incorporate only one epicyclic gear so that it provides only two ratios and there are 2×2×4=16 forward gears (and eight reverse gears). This may be achieved by omitting the first epicyclic gear 91 and the corresponding brake 102 and by fixing the planet carrier 96 of the remaining epicyclic gear 92.

Although the coupling sleeves 50 have been described as synchronized, non-synchronized dog couplings can be employed in certain applications.

The cost of the gearbox is further reduced by utilizing common components as much as possible. In particular, the front wheel brake 74 may be of the same construction as the rear wheel brakes 84. The epicyclic gear of the preliminary gear 31 and the two epicyclic gears 91 and 92 of the splitter gear 35 preferably employ the same sun wheels, the same planet wheels and the same annuli.

Although, as noted above, the preliminary gear 31 can constitute the creep gear, a particularly advantageous utilization of the gear 31 is to enable the same gearbox to be utilized for a range of vehicles of different powers, while avoiding excessive wear in the higher power vehicles. The principle is to increase the power through the gearbox by increasing the speed at which the gearbox is driven, while maintaining the torque on the input shaft 30 substantially constant throughout the range of vehicles. This concept is described more fully in our co-pending European patent application EP No. 82306564.4.

The longitudinal differential 65 divides the power between the front and rear axles and the transmission ratio between the forward drive shaft 67 and the final drive shaft 66 is preferably selected in accordance with the diameters of the front and rear wheels and the respective final drive reduction ratios. This concept is described more fully in our co-pending European patent application EP No. 82306943.0.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications and variations which fall within the spirit and scope of the appended claims.

I claim:

1. A gearbox for a vehicle comprising a change-speed gear having a main shaft and a countershaft on first and second longitudinal shaft lines, respectively, an axle having half-shafts on a third transverse shaft line, a transverse differential driving the half-shafts and driven by a component on one of the longitudinal shaft lines, and a casing enclosing the change-speed gear and the differential and having bottom and top parts with a parting plane which contains the first, second and third shaft lines, the change-speed gear providing drive to an intermediate shaft on the first shaft line, the intermediate shaft being coupled to an output shaft on the second shaft line by selectively engageable forward and reverse gears, and by a selectively engageable coupling acting directly between the countershaft and the output shaft to provide a further range of forward gears.

2. A gearbox, according to claim 1, wherein the countershaft and output shaft are hollow and a forward drive shaft passes through these shafts to provide front-wheel drive.

3. A gearbox, according to claim 2, wherein an epicyclic longitudinal differential divides power flow from the output shaft between the differential for the rear axle, and the forward drive shaft with a transmission ratio therebetween in accordance with diameters of the front and rear wheels and their respective final reduction ratios.

4. A gearbox, according to claim 2, wherein a front wheel brake acts on the forward drive shaft.

5. A gearbox, according to claim 4, further comprising a rear wheel brake acting on the half-shafts and having the same construction as the front wheel brake.

6. A gearbox, according to claim 1, further comprising a splitter gear connected between an input shaft and the main shaft.

7. A gearbox, according to claim 6, wherein the splitter gear has a plurality of epicyclic stages, at least one of which is incorporated in the gearbox.

8. A gearbox, according to claim 6, wherein the change-speed gear is a top-shaft, synchronized gear with an intermediate shaft on the first shaft line and a forward/reverse gear coupling the intermediate shaft to an output shaft on the second shaft line.

9. A gearbox, according to claim 6, further comprising a preliminary speed reducer or amplifier gear establishing a predetermined torque at the input to the gearbox.

10. A gearbox, according to claim 9, wherein the preliminary gear and epicyclic stages of the splitter gear have sun wheels of the same diameter, planet wheels of the same diameter and annuli of the same diameter.

* * * * *